United States Patent [19]
Susko et al.

[11] Patent Number: 5,755,422
[45] Date of Patent: May 26, 1998

[54] AUTOMOTIVE SEAT TRACK ASSEMBLY HAVING SAFETY LOCKING DEVICE

[75] Inventors: Thomas J. Susko, East Pointe; Virgil L. Musselman, Howell; Shaun Nelson, Walled Lake, all of Mich.

[73] Assignee: Lear Corporation, Southfield, Mich.

[21] Appl. No.: 674,433

[22] Filed: Jul. 2, 1996

[51] Int. Cl.⁶ ............................................. F16M 13/00
[52] U.S. Cl. ............................................................ 248/430
[58] Field of Search ................................. 248/429, 430, 248/424; 296/65.1

[56] References Cited

U.S. PATENT DOCUMENTS

| | | | |
|---|---|---|---|
| 4,204,358 | 5/1980 | Courtois | 248/430 |
| 4,209,159 | 6/1980 | Becker et al. | 248/430 |
| 4,291,856 | 9/1981 | Urai | 248/429 |
| 4,508,385 | 4/1985 | Bowman | 248/430 |
| 4,669,782 | 6/1987 | Nishiyama et al. | 297/473 |
| 4,685,716 | 8/1987 | Kondo | 248/429 |
| 4,707,030 | 11/1987 | Harding | 248/430 |
| 4,733,845 | 3/1988 | Maiwald | 248/429 |
| 4,881,774 | 11/1989 | Bradley et al. | 248/430 |
| 5,106,144 | 4/1992 | Hayakawa et al. | 248/429 X |
| 5,172,882 | 12/1992 | Nini | 248/430 |
| 5,286,076 | 2/1994 | DeVoss et al. | 296/65.1 |
| 5,322,348 | 6/1994 | Johnson et al. | 248/430 |
| 5,358,207 | 10/1994 | West | 248/430 |

FOREIGN PATENT DOCUMENTS

| | | | |
|---|---|---|---|
| 0037726 | 10/1981 | European Pat. Off. | |
| 2738701 | 3/1979 | Germany | |
| 2901602 | 7/1979 | Germany | 248/430 |
| 63-64839 | 3/1988 | Japan | |
| 2219733 | 12/1989 | United Kingdom | 248/430 |

*Primary Examiner*—Ramon O. Ramirez
*Attorney, Agent, or Firm*—Howard & Howard

[57] ABSTRACT

An automotive seat assembly having a J-lock safety device which interlocks a rear seat entry track mechanism during high load situations. The entry track mechanism comprises a lower track and an upper track movably supported by the lower track for providing fore and aft movement of the seat assembly along a longitudinal axis. A downwardly facing first hook is attached to the lower track and has a J-shape with a long leg and a short leg interconnected by a bottom. An upwardly facing second hook is attached to the upper track and has a J-shape with a long leg and a short leg interconnected by a bottom. The short legs are in mechanically overlapping relationship for limiting relative movement of the tracks in a direction transverse to the longitudinal axis. The bottom of the first hook includes a plurality of apertures and a plurality of teeth extend upwardly from the short leg of the second hook, such that the teeth of the short leg of the second hook engage the apertures of the bottom of the first hook in response to impact forces urging the tracks in the direction transverse to the longitudinal axis.

12 Claims, 3 Drawing Sheets

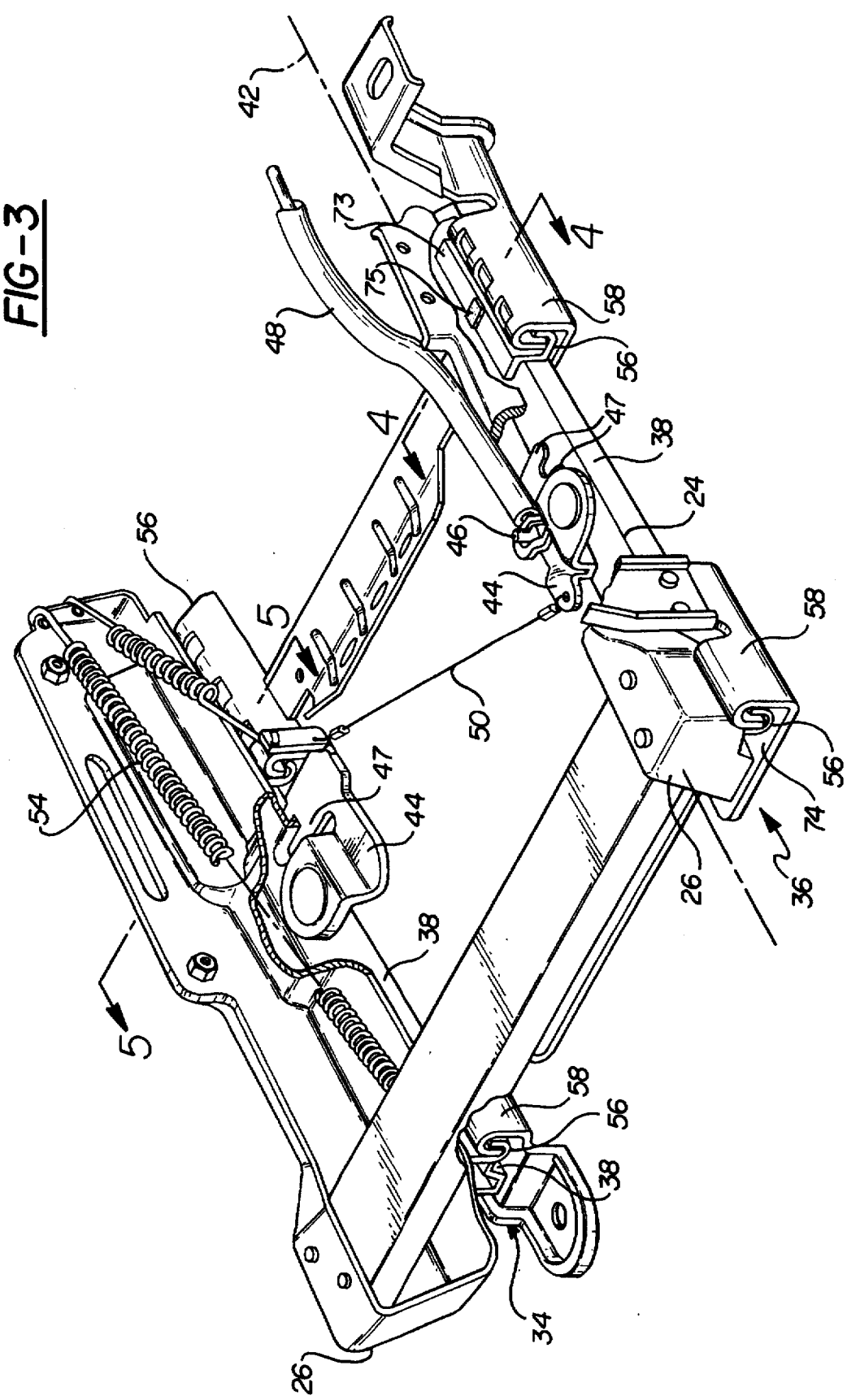

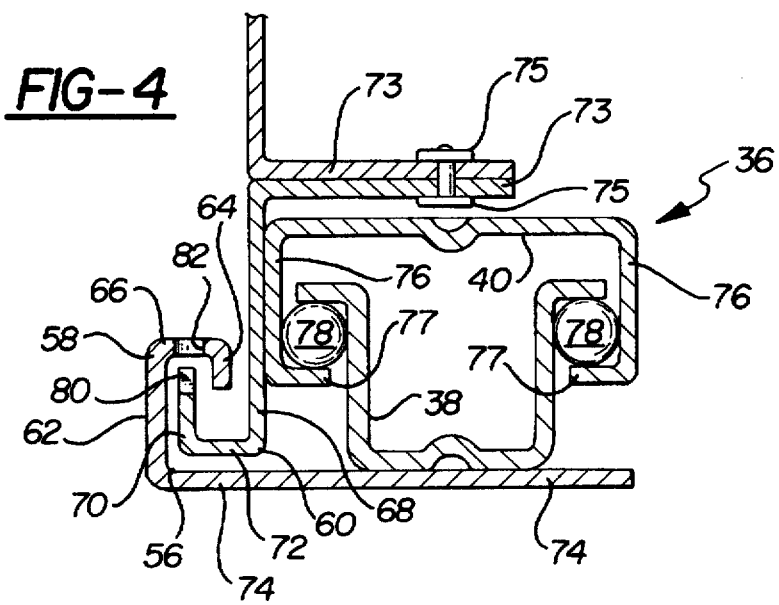
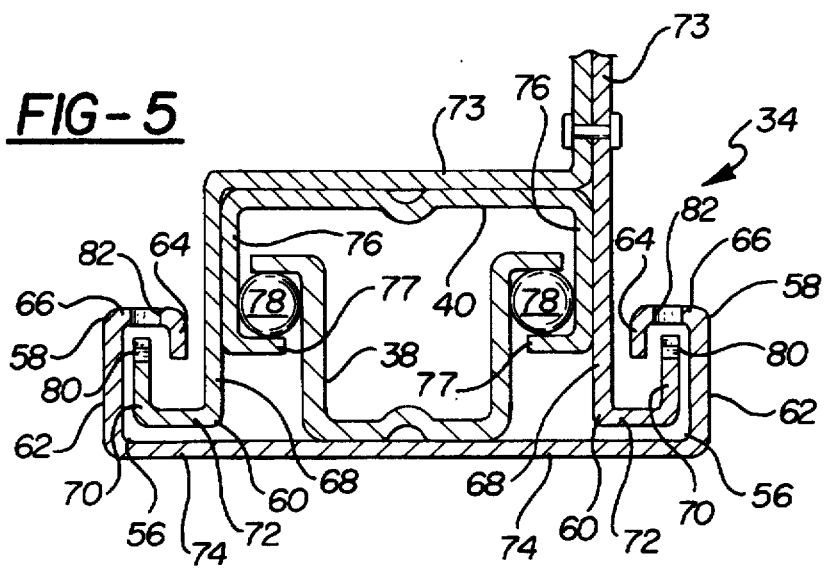
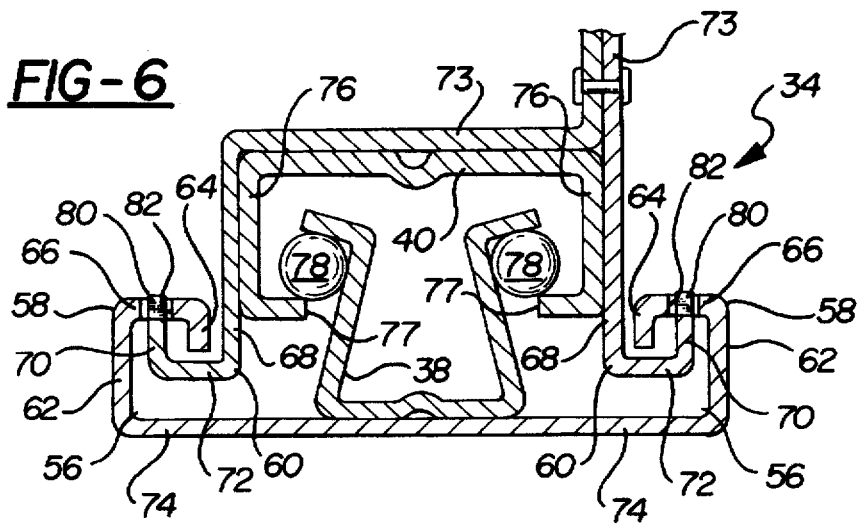

AUTOMOTIVE SEAT TRACK ASSEMBLY HAVING SAFETY LOCKING DEVICE

TECHNICAL FIELD

The subject invention relates to an automotive seat of the type having a seat adjustment track for normal fore and aft adjustment of the seat and a rear seat entry track for releasing the seat to a forward position which allows the ingress into a rear seating or storage area of a vehicle. More specifically, the subject invention relates to a safety locking device located on the rear seat entry track which resists any separation of the rear entry track.

BACKGROUND OF THE INVENTION

Automobiles and other vehicles are usually equipped with a seat assembly that is adjustable to many intermediate positions between a fore and aft position along a longitudinal axis. Sliding a seat forward or rearward to a particular position is desirable for enhancing an occupant's comfort. In most two door vehicles the front seats are also capable of automatically moving to a single forward position by simply actuating a lever and pushing a seat back forward. This forward movement of the seat assembly permits easier access into a rear seating or rear cargo area. The forward and rearward movements of the seat are commonly accomplished by a dual seat track assembly. The dual seat track assembly consists of a seat adjustment track mechanism and a rear seat entry track mechanism. Each track mechanism includes a lower track and an upper track movably supported on the lower track by a number of ball bearings. The lower track, of the entry track mechanism, is mounted to a vehicle floor pan and the upper track, of the entry track mechanism, is mounted to a riser. The lower track, of the adjustment track mechanism, is mounted to the riser and the upper track, of the adjustment track mechanism, is fixed to a seat bottom of the seat assembly.

The adjustment track mechanism allows a user to incrementally adjust the seat assembly to any number of fore or aft positions. In a manually actuated system, a user pulls on a lever which moves a latch out of engagement with an aperture in the lower track. This disengagement allows the user to slide the seat forwardly or rearwardly. Once the user has chosen a desired position, the user releases the lever which re-engages the latch with the lower track and locks the seat into a new position. The lower track includes a number of apertures extending along the entire length thereof to provide for a number of adjustment positions. The adjustment track mechanism may also be an electrical adjustment track which includes a number of gears for infinite fore and aft seat adjustment. As the seat assembly is moved fore and aft along the adjustment track mechanism, the entry track mechanism remains locked in a rearward seating position.

The rear seat entry track mechanism allows a user to automatically move the seat assembly to a forward position by simply actuating a lever and pushing a seat back of the seat assembly forward. When it is desired to access the rear seating or storage area of a vehicle, a user pulls a lever located on the outside of the seat back and/or the seat bottom which releases the seat back from its upright position. The user then pivotally pushes the seat back forward toward the seat bottom. The pivotal movement of the seat back pulls on a pull cable which in turn disengages a release latch from the lower track. A pretensioned spring urges the seat forward to a forward most position, thereby allowing easier access into the rear seating or storage area. The riser, adjustment track mechanism, seat bottom, seat back, and all other seating accessories move forward together to the forward position. When access to the rear seating or storage area is no longer desired, the user simply pushes the seat back rearward to its rearward most position which re-engages the latch with the lower track. The lower track has only one aperture located therein for locking the seat in the rear position. The adjustment track is not affected by this forward movement, hence a user's previous seating position is retained.

Traditionally, seat belt shoulder harnesses have been attached directly to the vehicle frame, i.e., the vehicle floor pan and a B-pillar. However, the current trend in the automotive industry is to attach the seat belt shoulder harnesses directly to the seat assembly. Some advantages of this design are ease of manufacture and added seating comfort when using the seat belts. The primary disadvantage is that this design dramatically increases the load characteristics on the seat assembly and in turn on the dual seat track assembly. During an emergency situation, i.e., a front end or rear end collision, the seat assembly may experience a significant amount of stress from various impact forces. At the highest impact loads, the upper tracks have a tendency to bend and separate from the lower tracks. This is especially true when a spacer is located between the adjustment track mechanism and the entry track mechanism. The extra height of the spacer increases the forward and rearward momentum force that the seat experiences. Hence, the upper and lower tracks on the entry track mechanism have a greater tendency to separate. One way to remedy this problem is to strengthen and thicken the seat tracks.

The subject invention is directed to solving the problem of rear seat entry track mechanism separation without having to increase the cost or weight of the mechanism.

SUMMARY OF THE INVENTION

The subject invention contemplates an automotive seat assembly comprising a first track and a second track movably supported by the first track for movement between forward and rearward positions along a longitudinal axis. A first hook is attached to the first track and has a J-shape with a long leg and a short leg interconnected by a bottom. A second hook is attached to the second track and has a J-shape with a long leg and a short leg interconnected by a bottom. The short legs are in mechanically overlapping relationship for limiting relative movement between the tracks in a direction transverse to the longitudinal axis. The assembly further includes the bottom of the first hook defining at least one aperture and at least one tooth extending upwardly from the short leg of the second hook, whereby the tooth of the short leg of the second hook engages the aperture of the bottom of the first hook in response to impact forces tending to separate the tracks in the direction transverse to the longitudinal axis.

Accordingly, the subject invention relates to a safety locking device which locks and retains a seat track mechanism during high load situations. The J-lock safety device is in close proximity to the seat track mechanism and includes at least one, and preferably a number of teeth and apertures for actively locking the upper and lower track together. The J-lock locks the seat assembly securely to the tracks and transfers any seat loads to a vehicle floor pan.

Hence, the subject invention provides a very compact and efficient combination for preventing the separation of the upper and lower tracks in response to an impact force.

BRIEF DESCRIPTION OF THE DRAWINGS

Other advantages of the present invention will be readily appreciated as the same becomes better understood by

Figure 1:
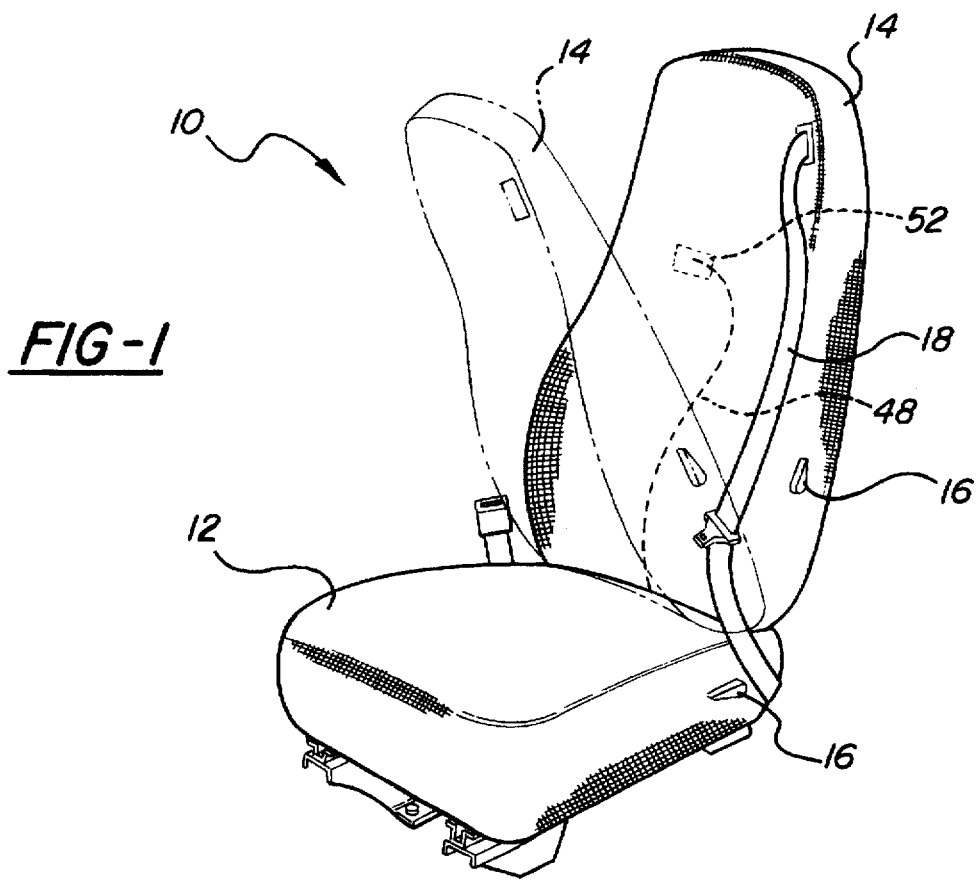
Figure 2:
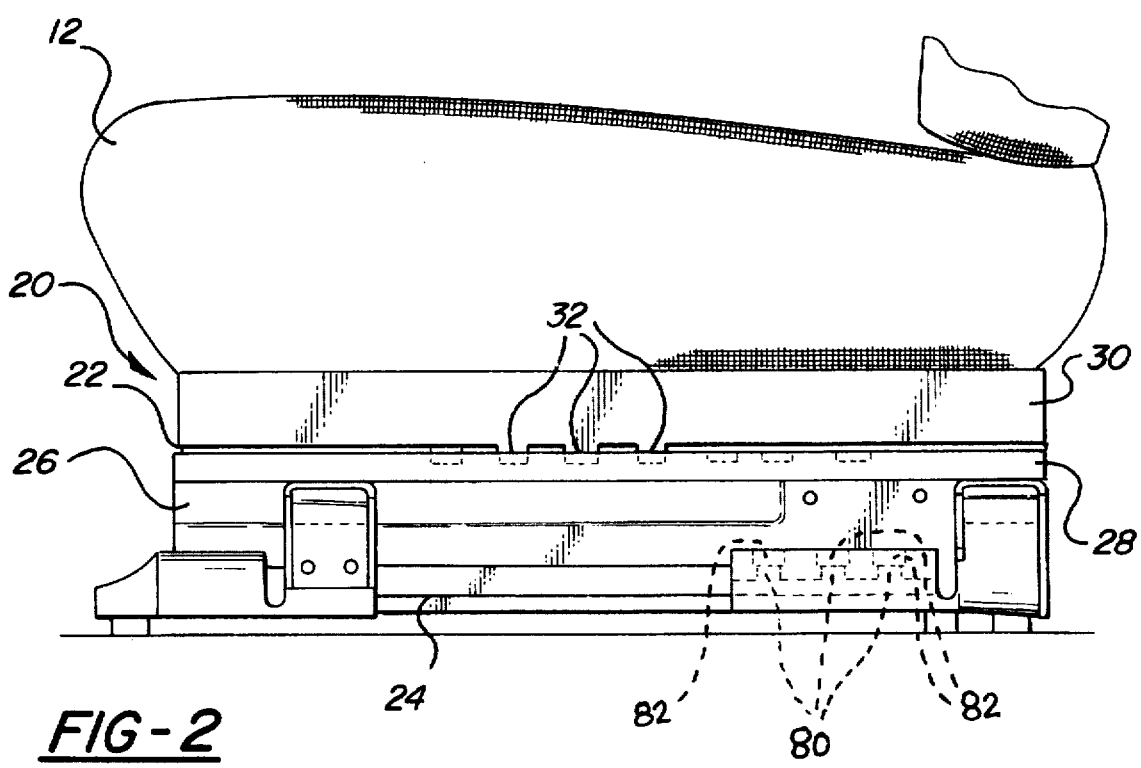

3 reference to the following detailed description when considered in connection with the accompanying drawings wherein:

FIG. 1 is a perspective view of a seat assembly utilizing the subject invention;

FIG. 2 is a fragmentary side view of the seat assembly of FIG. 1;

FIG. 3 is a perspective view of a rear seat entry track mechanism incorporating the subject invention;

FIG. 4 is a fragmentary cross sectional view taken along line 4—4 of FIG. 3;

FIG. 5 is a fragmentary cross sectional view taken along line 5—5 of FIG. 3; and FIG. 6 is a view similar to FIG. 5 but showing the rear seat entry track mechanism in an impact load partially separated position.

DETAILED DESCRIPTION OF THE PREFERRED EMBODIMENT

Referring to the Figures, wherein like numerals indicate like or corresponding parts throughout the several views, an automotive seat assembly is generally shown at 10. The seat assembly 10 includes a seat bottom 12 and a seat back 14 pivotally attached to the seat bottom 12. A seat back lever 16 is located on the side of the seat back 14 and on the seat bottom 12 adjacent the pivotal connection between the seat back 14 and the seat bottom 12. A seat belt shoulder harness 18 is shown extending from a top corner of the seat back 14 to an anchor (not shown) below the seat bottom 12. Referring to FIG. 2, a dual seat track assembly is generally shown at 20. The dual seat track assembly 20 comprises a seat adjustment track mechanism 22 and a rear seat entry track mechanism 24. A pair of risers 26 are spaced apart along opposing sides of the seat bottom 12 for spacing the adjustment track mechanism 22 from the entry track mechanism 24.

The adjustment track mechanism 22 allows a user to incrementally adjust the seat assembly 10 to any number of fore or aft positions. The adjustment track mechanism 22 includes a pair of lower tracks 28 which are fixedly mounted to their respective riser 26 along opposing sides of the seat bottom 12, and a pair of upper tracks 30 which are slideably coupled to the lower tracks 28 and fixedly mounted to the underside of the seat bottom 12. For illustrative purposes only one side of the adjustment track mechanism 22 is shown. The adjustment track mechanism 22 may be adjusted manually or electronically. In a manually actuated system, a user pulls a seat track lever (not shown) which moves a latch (not shown) out of engagement with an aperture 32 in the lower track 28. The user can then slide the seat assembly 10 forwardly or rearwardly along the adjustment track mechanism 22. Specifically, the upper tracks 30 utilize a number of ball bearings (not shown) to slide along the lower tracks 28. The lower tracks 28 include a number of apertures 32 extending along the entire length thereof for engagement with the latch to provide a plurality of adjustment positions. This type of adjustment track mechanism 22 is well known in the art as shown for example in U.S. Pat. No. 3,662,984 to Robinson et al., assigned to the assignee of the present invention and incorporated herein by reference. The movement of the adjustment track mechanism 22 does not affect the movement of the rear seat entry track mechanism 24.

The rear seat entry track mechanism 24 is best shown in FIGS. 3, 4, 5, & 6. It allows a user to automatically move the seat assembly 10 between a rearward position for normal occupant use and a forward position for access into a rear seating or storage area (not shown). This access is accomplished by simply releasing the seat back lever 16 and pushing the pivotal seat back 14 forward toward the seat bottom 12. The entry track mechanism 24 includes an inboard track component, generally designated at 34, and an outboard track component, generally designated at 36. Each inboard 34 and outboard 36 track component includes a lower track 38 fixedly secured to a vehicle floor pan (not shown) and an upper track 40 movably supported by the lower track 38 for movement between the forward and rearward positions along a longitudinal axis 42.

A release latch 44 is pivotally attached, via a pivot joint 45, to each of the lower tracks 38. Each release latch 44 includes a pair of track teeth 47 for selective engagement into a pair of entry track apertures 49 located on the lower tracks 38. A first distal end 46 of a pull cable 48 is anchored to one of the release latches 44. A wire 50 connects the two release latches 44 together; hence, when the control cable 48 is tensioned, the release latches 44 act simultaneously via interconnection of the wire 50. Specifically, the release latches 44 pivot about their respective pivot joints 45 which withdraws the track teeth 47 from the corresponding entry track apertures 49 to release the tracks 38, 40. A second distal end 52 of the pull cable 48 is mounted within the pivotal seat back 14 (shown in FIG. 1). A pretensioned seat slide spring 54 is attached to the lower seat track 38 at one end and to the riser 26 at the other end.

During operation of the rear seat entry track mechanism 24, a user simply actuates the seat back lever 16 which releases the seat back 14 from its upright seating position with respect to the seat bottom 12. The user then pushes the pivotal seat back 14 forward toward the seat bottom 12. This movement tensions the control cable 48 and actuates the release latches 44 as described above. The seat slide spring 54 automatically urges the seat assembly 10 to a forward most position for easier access into a rear seating or storage area. In other words, the latches 44 retain the upper track 40 in the rearward position while allowing free movement to the forward position upon release thereof. When access is no longer desired, a user pushes the seat back 14 rearwardly and the seat assembly 10 returns to its rearward seating position.

The rear seat entry track mechanism 24 also includes a J-lock safety device 56. Referring specifically to FIG. 3, the inboard track component 34 includes three J-lock safety devices 56. At the front of the inboard track component 34 a first J-lock safety device 56 is located on the inside surface of the inboard track 34 and at the rear of the inboard track component 34 a second and third J-lock safety device 56 are located on both the inside and outside (not shown) surfaces of the inboard track 34. Similarly, the outboard track component 36 includes two J-lock safety devices 56. At the front of the outboard track component 36 a first J-lock safety device 56 is located on the outside surface of the outboard track 36 and at the rear of outboard track component 36 a second J-lock safety device 56 is located on the outside surface of the outboard track 36.

The J-lock safety device 56 located on the outside surface at the rear of the outboard track component 36 is shown in greater detail in FIG. 4. Similarly, the second and third J-lock safety devices 56 located on the inside and outside surfaces at the rear of the inboard track component 34 are shown in greater detail in FIGS. 5 and 6. Each of the J-lock safety devices 56 comprise a downwardly facing first hook 58 and an upwardly facing second hook 60. The downwardly facing first hook 58 is attached to the stationary lower track 38 and has a J-shape with a long leg 62 and a short leg 64 interconnected by a bottom 66. The upwardly facing second hook 60 is attached to the slidable upper track 40 and also has a J-shape with a long leg 68 and a short leg 70 interconnected by a bottom 72.

The upper track 40 also includes a pair of spaced apart side walls 76 and a pair of inwardly projecting supports 77. The side walls 76 and supports 77 retain a number of ball bearings 78 in a sliding relationship to the lower track 38. Referring specifically to FIG. 4, the long leg 68 of the upwardly facing second hook 60 abuts one of the side walls 76 whereby the short leg 70 and bottom 66 project outwardly therefrom. The long leg 68 extends above the side wall 76 and connects to a pair of cross beams 73 which are in turn mounted between a pair of spacers 75. Referring to FIGS. 5 and 6, the long legs 68 of each upwardly facing second hook 60 abut a corresponding side wall 76 and extend above the side walls 76 into a pair of corresponding cross beams 73. Each of the short legs 70 and bottoms 66 extend outwardly from a corresponding side wall 76.

The short legs 64, 70 of the downwardly facing first hook 58 and upwardly facing second hook 60 are in a mechanically overlapping relationship. More specifically, the second hook 60 is disposed with the long leg 68 of the J-shape extending downwardly from the upper track 40 and through the bottom 72 of the J-shape and upwardly into the short leg 68 thereof. The first hook 58 is disposed outwardly of the second hook 60 with the long leg 62 thereof extending upwardly and the bottom 66 thereof spaced from and over the short leg 70 of said second hook 60, such that the short leg 64 of the first hook 58 is disposed between the short 70 and long 68 legs of the second hook 60. A connecting member 74 extends beyond the lower track 38 under the second hook 60 to the long leg 62 of the first hook 58. The first 58 and second 60 hooks are spaced laterally from the lower 38 and upper 40 tracks. This is advantageous because the seat tracks 38, 40 do not have to be reinforced. In other words, if a separation load is applied, the seat assembly load characteristics are transferred from the upwardly facing second hook 60 to the downwardly facing first hook 58 and then to the vehicle floor pan via the connecting member 74. In the case of a dual J-lock safety device 56, as shown in FIGS. 5 and 6, the connecting member 74 spans along the entire width of the upper 40 and lower 38 tracks and interconnects the second and third J-lock safety devices 56.

Pursuant to the present invention, the J-lock safety device 56 also includes a number of teeth 80 and apertures 82. Specifically, the bottom 66 of the first hook 58 includes a plurality of apertures 82 and the short leg 70 of the second hook 60 has a plurality of teeth 80 extending upwardly therefrom. The teeth 80 and apertures 82 are also shown in phantom in FIG. 2. As shown in FIGS. 4 and 5, the teeth 80 are spaced from and do not engage the apertures 82 when the seat assembly 10 is in a normal operating position. The teeth 80 simply move underneath the apertures 82 in response to forward movement of the seat assembly 10. In fact a substantial impact force must be experienced by the seat assembly 10 in order for the seat tracks 38, 40 to begin to separate, which engages the J-lock safety device 56.

Should the seat track be subjected to high separation loads, i.e., a frontal collision, the tracks 38, 40 will be urged in the direction transverse to the longitudinal axis 42. The separation forces also urge the seat tracks 38, 40 in a direction parallel to the longitudinal axis 42. In other words, these forces urge separation and sliding movement between the upper 40 and lower 38 tracks. As best shown in FIG. 6, the teeth 80 of the short leg 70 of the second hook 60 will then engage the apertures 82 of the bottom 66 of the first hook 58. This engagement retains the seat tracks 38, 40 together and simultaneously prevents any unintentional sliding between the seat tracks 38, 40. In addition, the engagement transfers the impact forces to the vehicle floor pan.

As discussed previously, the J-lock safety devices 56 are located only at the front and at the rear of the entry track mechanism 24. The J-locks 56 at the rear of the entry track mechanism 24 are longer and include a number of teeth 80 and apertures 82. Specifically, each rear J-lock 56 includes three teeth 80 and three corresponding apertures 82. The J-locks 56 at the front of the entry track mechanism 24 are relatively small and do not have any teeth or apertures. As is apparent to those skilled in the art, the seat assembly 10 will have a tendency to rotate rearwardly upon a rear end collision and a tendency to rotate forwardly upon a frontal collision. Also known to those skilled in the art, the momentum force or rotational force in a frontal collision is substantially larger than a rear end collision. These momentum or rotational forces are also disclosed as impact forces or separation forces. Accordingly, the front J-locks 56 can be relatively small and still be able to retard any seat track separation. The rear J-locks 56, however, must be longer and include teeth 80 and apertures 82 in order to adequately prevent any seat track separation and/or inadvertent seat track sliding. Of course if a particular seat assembly experiences greater momentum force in a rear end collision, teeth and apertures could be located on the front J-lock safety devices as well.

Alternatively, the teeth 80 could be provided on the short leg 64 of the downwardly facing first hook 58 and corresponding apertures in the bottom 72 of the upwardly facing second hook 60. Similarly each hook 58, 60 could include teeth 80 and corresponding apertures 82 in alternative sequence.

It is also pertinent to note that when the seat assembly 10 is in the forward position, i.e., in a position that allows easier access to a rear seating or storage area, the first 58 and second 60 hooks are out of alignment and are not engageable. It is not necessary to extend the J-lock safety device 56 along the entire length of the lower 38 and upper 40 tracks because an occupant will not be sitting in the seat assembly 10 when the seat is in its forward position. As discussed above, the only other position for the entry track mechanism 24 is the rear seating position where the first 58 and second hooks 60 are in perfect alignment.

The J-lock safety devices 56 discussed above is disclosed on a rear seat entry track mechanism 24. However, it should be appreciated that the J-lock safety device 56 could also be located on a seat adjustment track mechanism 22 without deviating from the scope of the subject invention.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, the invention may be practiced otherwise than as specifically described.

What is claimed is:

1. An automotive seat assembly comprising;
   a first track member,
   a second track member movably supported by said first track member for movement between forward and rearward positions along a longitudinal axis,
   a first hook attached to said first track member and having a J-shape with a long leg and a short leg interconnected by a bottom, a second hook attached to said second track member and having a J-shape with a long leg and a short leg interconnected by a bottom, said short legs being in a mechanically overlapping relationship for limiting relative movement between said track members in a direction transverse to said longitudinal axis, said first and second hooks being spaced laterally from said first and second track members, and said bottom of said first hook defining at least one aperture and at least one tooth extending from said short leg of said second hook whereby said tooth of said short leg of said second hook engages said aperture of said bottom of said first hook in response to impact forces urging said track members in said direction transverse to said longitudinal axis.

2. An assembly as set forth in claim 1 wherein said first and second hooks are divided into spaced apart fore and aft sections.

3. An assembly as set forth in claim 2 wherein said second track member comprises spaced side walls and said second hook extends from each of said spaced side walls.

4. An assembly as set forth in claim 1 wherein said second hook is disposed with said long leg of the J-shape extending downwardly from said second track member and through said bottom of the J-shape and upwardly into said short leg thereof and said first hook is disposed outwardly of said second hook with said long leg thereof extending upwardly with said bottom thereof spaced from and over said short leg of said second hook so that said short leg of said first hook is disposed between said short and long legs of said second hook.

5. An assembly as set forth in claim 4 including a connecting member extending from said first track member under said second hook to said long leg of said first hook.

6. An automotive seat assembly comprising;

a lower track member, an upper track member movably supported by said lower track member for movement along a longitudinal axis between a rearward position for normal occupant use and a forward position for access into a rear seating area, a seat adjustment track mechanism mounted on said upper track member for incrementally adjusting the seat assembly to any one of a plurality of positions between fore and aft positions, a downwardly facing first hook attached to said lower track member and having a J-shape with a long leg and a short leg interconnected by a bottom, an upwardly facing second hook attached to said upper track member and having a J-shape with a long leg and a short leg interconnected by a bottom, said short legs being in a mechanically overlapping relationship for limiting relative movement between said track members in a direction transverse to said longitudinal axis, and said bottom of said first hook defining a plurality of apertures and a plurality of teeth extending upwardly from said short leg of said second hook whereby said teeth of said short leg of said second hook engage said apertures of said bottom of said first hook in response to impact forces urging said track members in said direction transverse to said longitudinal axis.

7. An assembly as set forth in claim 6 wherein said first and second hooks are spaced laterally from said lower and upper track members.

8. An assembly as set forth in claim 7 including a latch for latching said upper track member in said rearward position while allowing free movement to said forward position upon release thereof.

9. An assembly as set forth in claim 8 wherein said first and second hooks are divided into spaced apart fore and aft sections.

10. An assembly as set forth in claim 9 wherein said upper track member comprises spaced side walls and said second hook extends from each of said spaced side walls.

11. An assembly as set forth in claim 6 wherein said second hook is disposed with said long leg of the J-shape extending downwardly from said upper track member and through said bottom of the J-shape and upwardly into said short leg thereof and said first hook is disposed outwardly of said second hook with said long leg thereof extending upwardly with said bottom thereof spaced from and over said short leg of said second hook so that said short leg of said first hook is disposed between said short and long legs of said second hook.

12. An assembly as set forth in claim 11 including a connecting member extending from said lower track member under said second hook to said long leg of said first hook.

* * * * *